US007810162B2

(12) United States Patent
Lee et al.

(10) Patent No.: US 7,810,162 B2
(45) Date of Patent: Oct. 5, 2010

(54) METHOD AND APPARATUS FOR PLAYING BACK CONTENT BASED ON DIGITAL RIGHTS MANAGEMENT BETWEEN PORTABLE STORAGE AND DEVICE, AND PORTABLE STORAGE FOR THE SAME

(75) Inventors: Byung-rae Lee, Yongin-si (KR); Tae-sung Kim, Seoul (KR); Kyung-im Jung, Seongnam-si (KR); Yun-sang Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1560 days.

(21) Appl. No.: 11/090,990

(22) Filed: Mar. 28, 2005

(65) Prior Publication Data
US 2005/0216763 A1 Sep. 29, 2005

Related U.S. Application Data

(60) Provisional application No. 60/575,757, filed on Jun. 1, 2004.

(30) Foreign Application Priority Data
Mar. 29, 2004 (KR) ........................ 10-2004-0021300

(51) Int. Cl.
H04N 7/16 (2006.01)
G06F 17/30 (2006.01)
(52) U.S. Cl. ......................................... 726/27; 380/201
(58) Field of Classification Search .................. 726/26, 726/27, 29; 380/201
See application file for complete search history.

(56) References Cited

U.S. PATENT DOCUMENTS 6,470,138 B1 * 10/2002 Um et al. ....................... 386/94

| 6,859,535 | B1 * | 2/2005 | Tatebayashi et al. | 380/201 |
|---|---|---|---|---|
| 7,010,808 | B1 * | 3/2006 | Leung et al. | 726/26 |
| 7,073,063 | B2 * | 7/2006 | Peinado | 713/171 |
| 7,085,840 | B2 * | 8/2006 | de Jong et al. | 709/229 |
| 7,124,304 | B2 * | 10/2006 | Bel et al. | 713/193 |
| 7,240,365 | B2 * | 7/2007 | de Jong et al. | 726/9 |
| 7,275,260 | B2 * | 9/2007 | de Jong et al. | 726/10 |
| 7,278,165 | B2 * | 10/2007 | Molaro | 726/27 |
| 7,353,402 | B2 * | 4/2008 | Bourne et al. | 713/193 |
| 7,380,280 | B2 * | 5/2008 | de Jong | 726/27 |
| 7,398,557 | B2 * | 7/2008 | de Jong | 726/29 |
| 7,406,177 | B2 * | 7/2008 | Sako et al. | 380/201 |
| 7,424,615 | B1 * | 9/2008 | Jalbert et al. | 713/171 |
| 7,493,289 | B2 * | 2/2009 | Verosub et al. | 705/51 |

(Continued)

FOREIGN PATENT DOCUMENTS

CN 1433611 A 7/2003

(Continued)

Primary Examiner—David García Cervetti
(74) Attorney, Agent, or Firm—Sughrue Mion, PLLC (57) ABSTRACT

A method of playing back content based on digital rights management (DRM) between a portable storage and a device and a portable storage for the same are provided. The method includes requesting the portable storage to set a playback right for content protected through DRM, receiving an encrypted playback right for the content protected through DRM from the portable storage, and decrypting the encrypted playback right and playing back the content protected through DRM using the decrypted playback right.

18 Claims, 9 Drawing Sheets

U.S. PATENT DOCUMENTS

| | | |
|---|---|---|
| 7,496,751 B2 * | 2/2009 | de Jong et al. ............... 713/155 |
| 7,653,946 B2 | 1/2010 | Kasser |
| 2002/0013772 A1 * | 1/2002 | Peinado ........................ 705/51 |
| 2002/0023219 A1 * | 2/2002 | Treffers et al. ............... 713/176 |
| 2002/0029347 A1 | 3/2002 | Edelman |
| 2002/0165825 A1 | 11/2002 | Matsushita et al. |
| 2002/0174354 A1 * | 11/2002 | Bel et al. ..................... 713/193 |
| 2002/0184492 A1 * | 12/2002 | Hori et al. ................... 713/158 |
| 2003/0007437 A1 * | 1/2003 | Staring .................... 369/53.21 |
| 2003/0078853 A1 * | 4/2003 | Peinado et al. ................. 705/26 |
| 2003/0163374 A1 * | 8/2003 | Akiyama ..................... 705/14 |
| 2003/0194092 A1 * | 10/2003 | Parks et al. .................. 380/281 |
| 2003/0225863 A1 * | 12/2003 | Kajino et al. ................ 709/219 |
| 2004/0003270 A1 * | 1/2004 | Bourne et al. ............... 713/193 |
| 2004/0010467 A1 * | 1/2004 | Hori et al. ...................... 705/50 |
| 2004/0024652 A1 * | 2/2004 | Buhse et al. ................. 705/26 |
| 2004/0054923 A1 * | 3/2004 | Seago et al. ................. 713/201 |
| 2004/0078573 A1 * | 4/2004 | Matsuyama ................. 713/175 |
| 2004/0083215 A1 * | 4/2004 | de Jong .......................... 707/7 |
| 2004/0083370 A1 * | 4/2004 | de Jong ......................... 713/182 |
| 2004/0083391 A1 * | 4/2004 | De Jong ......................... 713/201 |
| 2004/0096189 A1 * | 5/2004 | Sako et al. .................... 386/94 |
| 2004/0139027 A1 * | 7/2004 | Molaro ........................ 705/59 |
| 2004/0139207 A1 * | 7/2004 | de Jong ........................ 709/229 |
| 2004/0172536 A1 * | 9/2004 | Malville et al. ............. 713/169 |
| 2004/0187014 A1 * | 9/2004 | Molaro ....................... 713/200 |
| 2004/0205028 A1 * | 10/2004 | Verosub et al. ............... 705/59 |
| 2004/0213408 A1 * | 10/2004 | Kim et al. .................... 380/200 |
| 2004/0243488 A1 * | 12/2004 | Yamamoto et al. ............. 705/30 |
| 2005/0004875 A1 * | 1/2005 | Kontio et al. .................. 705/52 |
| 2005/0010790 A1 * | 1/2005 | Lang et al. ................... 713/193 |
| 2005/0010791 A1 * | 1/2005 | Lang et al. ................... 713/193 |
| 2005/0021948 A1 * | 1/2005 | Kamperman ................ 713/165 |
| 2005/0033964 A1 * | 2/2005 | Albanese et al. ............. 713/171 |
| 2005/0235142 A1 * | 10/2005 | Fontijn ........................ 713/165 |
| 2006/0218646 A1 * | 9/2006 | Fontijn ........................ 726/27 |
| 2007/0100963 A1 * | 5/2007 | Ban et al. .................... 709/217 |
| 2007/0220575 A1 * | 9/2007 | Cooper et al. ................ 725/118 |
| 2007/0226511 A1 * | 9/2007 | Wei et al. .................... 713/186 |
| 2008/0123481 A1 * | 5/2008 | Fontijn ........................ 369/47.1 |
| 2008/0148362 A1 * | 6/2008 | Gilder et al. ................... 726/4 |

FOREIGN PATENT DOCUMENTS

| | | |
|---|---|---|
| JP | 2000-215107 A | 8/2000 |
| JP | 2002-15147 A | 1/2002 |
| JP | 2002-215465 A | 8/2002 |
| JP | 2002-368732 A | 12/2002 |
| JP | 2003-131950 A | 5/2003 |
| KR | 2001-0083934 A | 9/2001 |
| WO | 01/69842 A1 | 9/2001 |
| WO | WO 02/086725 A1 | 10/2002 |
| WO | WO 02/101577 A1 | 12/2002 |
| WO | 03/026207 A2 | 3/2003 |
| WO | WO 03/042988 A1 | 5/2003 |

* cited by examiner

| | | | Description | Type |
|---|---|---|---|---|
| 410 — Version | | | The DRM System Version | 1 byte |
| 420 — Asset | Id | | Name of this asset | Not fixed |
| | Uid | | ContentURI of DCF | URI (256 bytes) |
| | Inherit | | Subscription id | Not fixed |
| | KeyValue | | Content Encryption Key | 128 bits |
| | ... | | ... | ... |
| 430 — Permission | Idref | | Name of id in asset | Not fixed |
| | Play | | Constraint | Constraint |
| | Display | | Constraint | Constraint |
| | Execute | | Constraint | Constraint |
| | Print | | Constraint | Constraint |
| | Export | Mode | "move" or "copy" | 4 bytes |
| | | Constraint | Constraint | Constraint |
| | ... | | ... | ... |

FIG. 5

| | Constraint | | Description | Type |
|---|---|---|---|---|
| 510 | Count | | A positive integer | 1 byte |
| 520 | Datetime | Start | CCYY-MM-DDThh:mm:ss | [ISO8601](19b) |
| | | End | CCYY-MM-DDThh:mm:ss | [ISO8601](19b) |
| | | Duration | PnDTnHnMnS | [ISO8601] |
| 530 | Interval | Start | CCYY-MM-DDThh:mm:ss | [ISO8601](19b) |
| | | End | CCYY-MM-DDThh:mm:ss | [ISO8601](19b) |
| 540 | Accumulated | | PnDTnHnMnS | 15 bytes or 24 bytes |
| 550 | Individual | | URI | |
| 560 | System | Version | The target DRM system version | 1 byte |
| | | Uid | Name of the target DRM system | Not fixed |

FIG. 6

INSTRUCTION

| CLA | INS | P1 | P2 | Lc | Data Field | Le |
|---|---|---|---|---|---|---|
| 00 | 74 | 03 | 01 | FF | TLV | 00 |

INSTRUCTION PARAMETERS

| P1 | P2 | Description |
|---|---|---|
| 03 | 01 | -P1 : INSTRUCTION RELATING PLAYBACK<br>-P2 : SETTING OF CONTENT INFORMATION |

| | | Description |
|---|---|---|
| Lc | | FF |
| Data Field | T | 0×74 |
| | L | LENGTH OF V |
| | V | E(K,CID\|\|Time) |
| Le | | 00 |

RESPONSE

| Data field | Description |
|---|---|
| T | None |
| L | None |
| V | None |

| Status Word | | Description |
|---|---|---|
| SW1 | SW2 | |
| 90 | 00 | SUCCESSFUL EXECUTION OF INSTRUCTION |
| 6D | 00 | UNKNOWN TAG |
| 6B | 00 | WRONG PARAMETER IN V-FIELD |
| 69 | 82 | GENERAL AUTHENTICATION NEEDED |
| | 85 | AUTHENTICATION NEEDED |
| 66 | 03 | RIGHTS OBJECT UNFOUND |
| 66 | 04 | LAPSING OF PLAYBACK RIGHT |
| 6A | 83 | CONTENT UNFOUND |

FIG. 7

INSTRUCTION

| CLA | INS | P1 | P2 | Lc | Data Field | Le |
|---|---|---|---|---|---|---|
| 00 | 74 | 03 | 02 | 00 | None | FF |

INSTRUCTION PARAMETERS

| P1 | P2 | Description |
|---|---|---|
| 03 | 02 | -P1 : INSTRUCTION RELATING PLAYBACK<br>-P2 : BRINGING OF RIGHTS OBJECT FOR PLAYBACK |

| | | Description |
|---|---|---|
| Lc | | 00 |
| Data Field | T | None |
| | L | None |
| | V | None |
| Le | | FF |

RESPONSE

| Data field | Description |
|---|---|
| T | 0×74 |
| L | LENGTH OF V |
| V | E(K,CEK) |

| Status Word | | Description |
|---|---|---|
| SW1 | SW2 | |
| 90 | 00 | SUCCESSFUL EXECUTION OF INSTRUCTION |
| 6D | 00 | UNKNOWN TAG |
| 6B | 00 | WRONG PARAMETER IN V-FIELD |
| 69 | 82 | GENERAL AUTHENTICATION NEEDED |
| | 85 | AUTHENTICATION NEEDED |

METHOD AND APPARATUS FOR PLAYING BACK CONTENT BASED ON DIGITAL RIGHTS MANAGEMENT BETWEEN PORTABLE STORAGE AND DEVICE, AND PORTABLE STORAGE FOR THE SAME

CROSS-REFERENCE TO RELATED APPLICATIONS

This application claims priority from Korean Patent Application No. 10-2004-0021300 filed on Mar. 29, 2004 in the Korean Intellectual Property Office, and U.S. Provisional Patent Application No. 60/575,757 filed on Jun. 1, 2004 in the United States Patent and Trademark Office, the disclosures of which are incorporated herein by reference in its entirety.

BACKGROUND OF THE INVENTION

1. Field of the Invention

The present invention relates to digital rights management (DRM), and more particularly, to a method and apparatus of playing back content based on DRM between a portable storage and a device, and the portable storage for the same.

2. Description of the Related Art

Recently, DRM has been actively researched and developed. Commercial services using DRM have already been used or will be used. DRM needs to be used because of the following various characteristics of digital content. That is to say, unlike analog data, digital content can be copied without loss and can be easily reused, processed, and distributed, and only a small amount of cost is needed to copy and distribute the digital content. However, a large amount of cost, labor, and time are needed to produce the digital content. Thus, when the digital content is copied and distributed without permission, a producer of the digital content may lose his/her profit, and his/her enthusiasm for creation may be discouraged. As a result, development of digital content business may be hampered.

There have been several efforts to protect digital content. Conventionally, digital content protection has been concentrated on preventing non-permitted access to digital content, permitting only people paid charges to access the digital content. Thus, people who paid charges to the digital content are allowed to unencrypted digital content while people who did not pay charges are not allowed to. In this case, when a person paid charges intentionally distributes the digital content to other people, however, the people can use the digital content without paying charges. To solve this program, DRM was introduced. In DRM, any one is allowed to freely access encoded digital content, but a license referred to as a rights object is needed to decode and execute the digital content. Accordingly, the digital content can be more effectively protected by using DRM.

Figure 1:
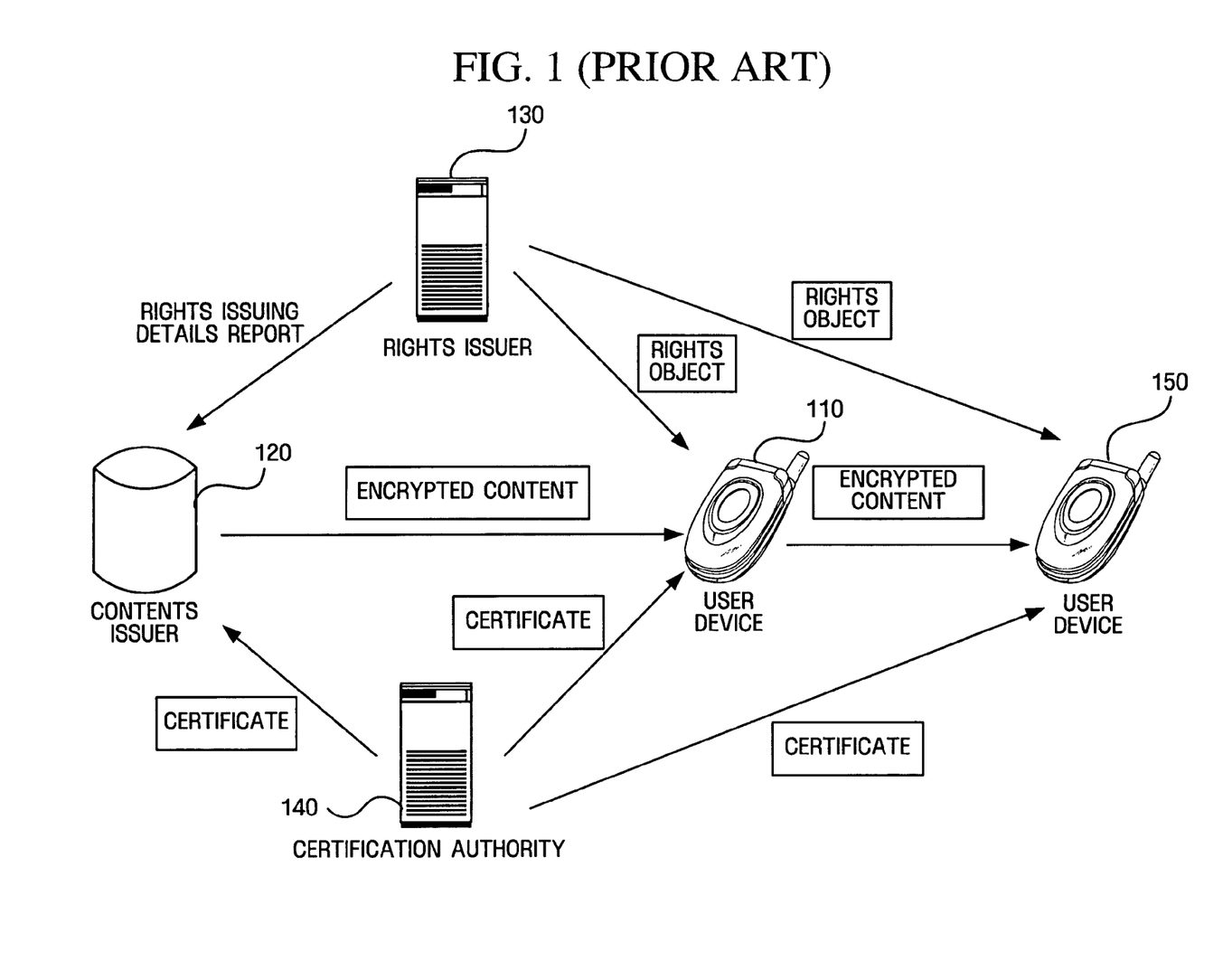
FIG. 1 is a conceptual diagram of DRM.

The concept of DRM is illustrated in FIG. 1. DRM relates to management of contents (hereafter, referred to as encrypted contents) protected using a method such as encryption or scrambling and rights objects allowing access to the encrypted contents.

Referring to FIG. 1, a DRM system includes user devices 110 and 150 wanting to access content protected by DRM, a contents issuer 120 issuing content, a rights issuer 130 issuing a rights object containing a right to access the content, and a certification authority 140 issuing a certificate.

In operation, the user device 110 can obtain desired content from the contents issuer 120 in an encrypted format protected by DRM. The user device 110 can obtain a license to play the encrypted content from a rights object received from the rights issuer 130. Then, the user device 110 can play the encrypted content. Since encrypted contents can be circulated or distributed freely, the user device 110 can freely transmit the encrypted content to the user device 150. The user device 150 needs the rights object to play the encrypted content. The rights object can be obtained from the rights issuer 130. Meanwhile, the certification authority 140 issues a certificate indicating that the contents issuer 120 is authentic and the user devices 110 and 150 are authorized devices. The certificate may be embedded into the user devices 110 and 150 when the devices are manufactured and may be reissued by the certification authority 140 after a predetermined duration has expired.

DRM protects the profits of those producing or providing digital contents and thus may be helpful in advancing the digital content industry. Although a rights object or encrypted content can be transferred between user devices 110 and 150 using mobile devices, as shown in FIG. 1, the transfer is inconvenient as a practical matter. Accordingly, to facilitate move of rights objects and encrypted contents between devices, efficient move of data between a device and a portable storage device intermediating between the devices is desired. In other words, a method enabling a device to access content protected by DRM using a rights object included in a portable storage is desired.

SUMMARY OF THE INVENTION

The present invention provides a method of playing back content protected through DRM using a device and a portable storage.

The present invention also provides a portable storage and a device for performing the method.

According to an aspect of the present invention, there is provided a method of playing back content using a portable storage, including requesting the portable storage to set a playback right for content protected through DRM, receiving an encrypted playback right for the content protected through DRM from the portable storage, and decrypting the encrypted playback right and playing back the content protected through DRM using the decrypted playback right.

According to another aspect of the present invention, there is provided a method of delivering a playback right for content to a device, the method including receiving a request to set the playback right for the content protected through DRM from the device, finding a rights object including the playback right and encrypting the playback right obtained from the rights object, and transmitting the encrypted playback right to the device.

According to still another aspect of the present invention, there is provided a portable storage including an interface module for connection with a device, a rights object storage module storing at least one encrypted rights object, an encryption module generating a session key and performing symmetric-key encryption and public-key encryption, and a DRM agent module performing DRM operations, wherein the DRM agent module finds a rights object for content among rights objects stored in the rights object storage module when receiving a request for the playback right for the content from the device through the interface module, decrypts the rights object using the encryption module to find a content encryption key included in the rights object, encrypts the content encryption key using the encryption module using the session key, and sends the encrypted content encryption key to the device through the interface module.

According to yet another aspect of the present invention, there is provided an apparatus for playing back content using a portable storage, the apparatus including an interface module for connection with the portable storage, a content storage module storing at least one content protected through DRM, an encryption module generating a session key and performing symmetric-key encryption and public-key encryption, and a DRM agent module performing DRM operations, wherein the DRM agent module requests a playback right for content that is protected through DRM and stored in the content storage module from the portable storage via the interface module, receives a content encryption key encrypted using the session key from the portable storage, decrypts the received content encryption key using the encryption module, and decrypts the content protected through DRM using the content encryption key to playback the content.

BRIEF DESCRIPTION OF THE DRAWINGS

The above and other aspects of the present invention will become more apparent by describing in detail preferred embodiments thereof with reference to the attached drawings in which.

DETAILED DESCRIPTION OF THE EXEMPLARY EMBODIMENTS

Hereinafter, exemplary embodiments of the present invention will be described in detail with reference to the attached drawings.

Before the detailed description is set forth, terms used in this specification will be described briefly. Description of terms is to be construed provided for a better understanding of the specification and terms that are not explicitly defined herein are not intended to limit the broad aspect of the invention.

Public-Key Cryptography

Public-key cryptography is referred to as an asymmetric cipher in which a key used for encryption is different from a key used for decryption. A public-key algorithm is open to the public, but it is impossible or difficult to decrypt original content with only a cryptographic algorithm, an encryption key, and ciphered text. Examples of a public-key cryptographic system include Diffie-Hellman cryptosystems, RSA cryptosystems, ElGamal cryptosystems, and elliptic curve cryptosystems. The public-key cryptography is about 100-1000 times slower than symmetric-key cryptography and is thus usually used for key exchange and digital signature not for encryption of content.

Symmetric-Key Cryptography

Symmetric-key cryptography is a symmetric cipher referred to as secret-key cryptography using the same key encryption and decryption. A data encryption standard (DES) is a most usual symmetric cipher. Recently, applications using an advanced encryption standard (AES) have increased.

Certificate

A certification authority certifies users of a public key with respect to a public-key cipher. A certificate is a message containing a public key and a person's identity information which are signed by the certification authority using a private key. Accordingly, the integrity of the certificate can be easily considered by applying the public key of the certification authority to the certificate, and therefore, attackers are prevented from modulating a user's public key.

Digital Signature

A digital signature is generated by a signer to indicate that a document has been written. Examples of a digital signature are an RSA digital signature, an ElGamal digital signature, a digital signature algorithm (DSA) digital signature, and a Schnorr digital signature. When the RSA digital signature is used, a sender encrypts a message with his/her private key and sends the encrypted message to a recipient. The recipient decrypts the encrypted message. In this case, it is proved that the message has been encrypted by the sender.

Random Number

A random number is a sequence of numbers or characters with random properties. Since it costs a lot to generate a complete random number, a pseudo-random number may be used.

Portable Storage Device

A portable storage device used in the present invention includes a non-volatile memory such as a flash memory which data can be written to, read from, and deleted from and which can be connected to a device. Examples of such portable storage device are smart media, memory sticks, compact flash (CF) cards, xD cards, and multimedia cards. Hereinafter, a secure MMC will be explained as a portable storage device.

DRM Agent

A DRM agent is an entity of managing permissions for medium objects of a device win the device or secure MMC.

Figure 2:
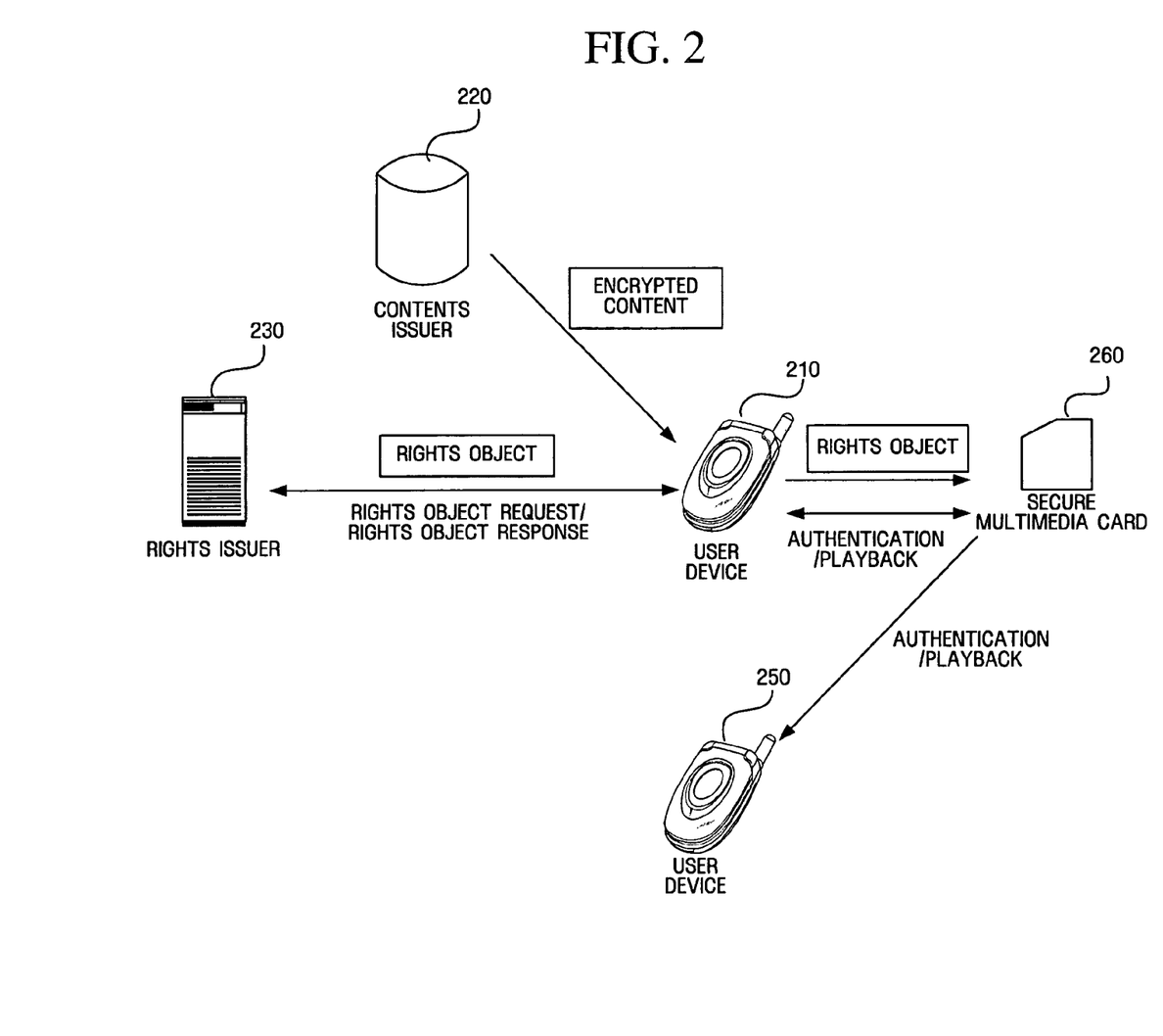
FIG. 2 is a schematic diagram illustrating the concept of a digital right according to an exemplary embodiment of the present invention.

FIG. 2 is a conceptual diagram of a digital right according to an exemplary embodiment of the present invention.

A user device 210 can obtain encrypted content from a contents issuer 220. The encrypted content is content protected through DRM. To play the encrypted content, an RO for the encrypted content is needed. An RO contains a definition of a right to content, constraints to the right, and a right to the RO itself. An example of the right to the content may be a playback. Examples of the constraints may be the number of playbacks, a playback time, and a playback duration. In addition, although not shown in FIG. 2, an example of the right to the RO may be a move or a copy.

After obtaining the encrypted content, the user device 210 may request a rights object from a rights issuer 230 to obtain a right to play back (referred to as a Playback right). When the user device 210 receives the rights object together with a rights object response from the rights issuer 230, the user device 210 can play back the encrypted content using the rights object. Meanwhile, the user device 210 may transfer the RO to a user device 250 having a corresponding encrypted object through a portable storage device. The portable storage device may be a secure MMC 260 having a DRM function. In this case, the user device 210 performs mutual authentication with the secure MMC 260 and then moves the RO to the secure MMC 260. To play the encrypted content, the user device 210 requests a right to play from the secure MMC 260 and receives the right to play, i.e., a content encryption key, from the secure MMC 260. Meanwhile, after performing mutual authentication with a user device 250, a secure multimedia card 260 enables the user device 250 to play back the encrypted content. In this case, authentication between a device and a secure MMC is needed to enable the device to use the secure MMC. An authentication procedure will be described in detail with reference to FIG. 3.

Figure 3:
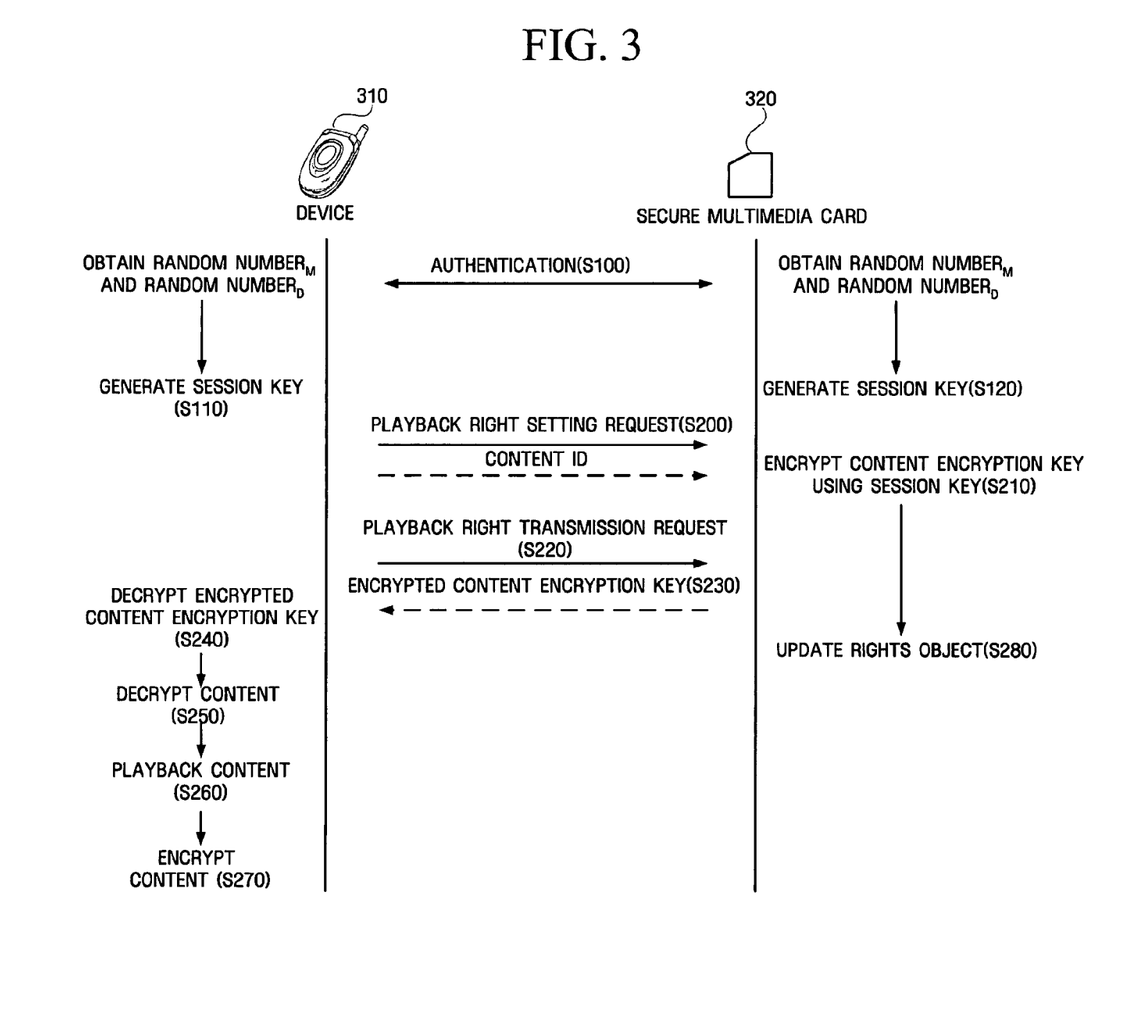
FIG. 3 illustrates a method of playing back content according to an exemplary embodiment of the present invention.

FIG. 3 illustrates a method of playing back content according to an embodiment of the present invention. Here, a subscript "D" of an object indicates that the object is possessed or generated by a device and a subscript "M" of an object indicates that the object is possessed or generated by a secure multimedia card.

A device 310 can play back encrypted content using a rights object stored in a secure multimedia card 320. The rights object may be obtained from the device or other devices. Alternatively, the secure multimedia card 320 may be manufactured to have the rights object.

To play back the encrypted content, in operation S100, authentication should be performed between the device 310 and the secure multimedia card 320. During the authentication, each of the device 310 and the secure multimedia card 320 receives each other's certificate and determines whether the other is an authentic device (or program) by verifying the certificate. For example, the secure multimedia card 320 may receive a device certificate$_D$ from the device 310, verify that the device 310 is an authentic device (or program), and obtain a device public key$_D$. Similarly, the device 310 may receive a secure multimedia card certificate$_M$ from the secure multimedia card 320, verify that the secure multimedia card 320 is an authentic device (or program), and obtain a secure multimedia card public key$_M$.

During the authentication, one of the device 310 and the secure multimedia card 320 may generate a random number, encrypt the random number using the other's public key, and transmit the encrypted random number. Here, the random number may be used as a session key. For example, the device 310 generates a random number$_D$, encrypts the random number$_D$ using the secure multimedia card public key$_M$, and transmits the encrypted random number$_D$ to the secure multimedia card 320. Then, the secure multimedia card 320 decrypts the encrypted random number$_D$ using a secure multimedia card private key$_M$ related with the secure multimedia card public key$_M$ to obtain the random number$_D$. The device 310 and the secure multimedia card 320 may use the random number$_D$ as a session key.

Both of the device 310 and the secure multimedia card 320 may preferably generate random numbers, respectively, and exchange them to increase randomness. In other words, through the authentication, the device 310 and the secure multimedia card 320 become to have the random number$_D$ and a random number$_M$. In operations S110 and S120, the device 310 and the secure multimedia card 320 generate the same session keys, respectively, using the random number$_D$ and the random number$_M$. A published algorithm may be used to generate a session key using two random numbers. In a simplest algorithm, two random numbers are subjected to an XOR operation to generate a session key.

When the device 310 plays back encrypted content, it requests a Playback right from the secure multimedia card 320 having a rights object. In an exemplary embodiment of the present invention, the device 310 sends an instruction to the secure multimedia card 320 and the secure multimedia card 320 sends a response to the instruction. In another embodiment, both of the device 310 and the secure multimedia card 320 can send an instruction. The former embodiment will be described below.

In operation S200, the device 310 sends a Playback right setting request to the secure multimedia card 320. When sending the Playback right setting request, a content ID identifying the content to be played back is also sent. In response to the Playback right setting request, the secure multimedia card 320 prepares to transmit a rights object to the device 310. For example, in operation S210, the secure multimedia card 320 finds a rights object for the content based on the content ID and encrypts a content encryption key included in the rights object using the session key. If the rights object stored in the secure multimedia card 320 has been encrypted, the rights object is decrypted to obtain the content encryption key and then the content encryption key is encrypted using the session key.

After a sufficient period of time for Playback right setting, in operation S220, the device 310 sends a Playback right transmission request to the secure multimedia card 320. In response to the Playback right transmission request, the secure multimedia card 320 sends the encrypted content encryption key to the device 310 as a response to an instruction. Since the encrypted content can be decrypted using the content encryption key, the content encryption key serves as a Playback right. An instruction and a response thereto will be described in detail later.

In operation S240, the device 310 decrypts the encrypted content encryption key using the session key and obtains the content encryption key. Next, in operation S250, the device 310 decrypts the encrypted content using the content encryption key. In operation S260, the device 310 plays back the decrypted content. After finishing playback of the content, in operation S270, the device 310 encrypts the content.

Meanwhile, in operation S280, the secure multimedia card 320 updates the rights object according to the playback of the content. In an exemplary embodiment of the present invention, the secure multimedia card 320 updates the rights object the moment (S230) it sends the encrypted content encryption key to the device 310. In another exemplary embodiment of the present invention, the secure multimedia card 320 updates the rights object the moment (not shown) it is informed by the device 310 that the playback of the content has ended or that more than a predetermined amount of the content has been played back.

It may be preferable that the rights object has been encrypted or set to a non-readable state in the secure multimedia card 320 to prevent other devices from reading the content of the rights object. In a case where the rights object has been encrypted and stored in the device 310, the secure multimedia card 320 decrypts the rights object to obtain the content encryption key included in the rights object and encrypts the rights object after updating it. The rights object may be encrypted using a unique key possessed by the secure multimedia card 320 according to a symmetric-key algorithm or using the secure multimedia card private key$_M$ according to public-key cryptography such as RSA encryption. The format and constraints for a rights object will be described with reference to FIGS. 4 and 5 below.

Figure 4:
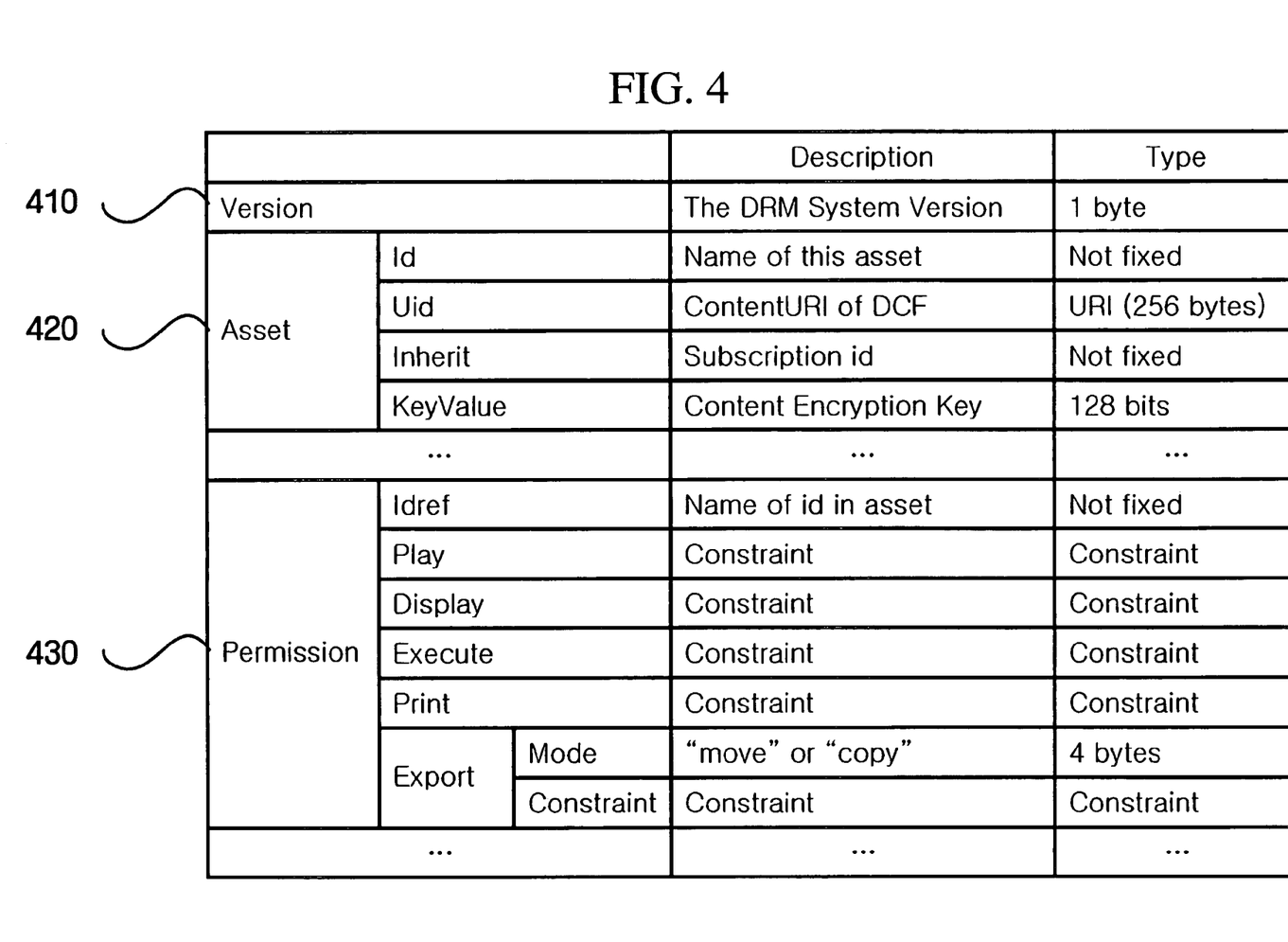
FIG. 4 illustrates a format of a rights object used to playback content according to an exemplary embodiment of the present invention.

FIG. 4 illustrates a format of a rights object used to playback content according to an exemplary embodiment of the present invention.

The rights object includes a version field 410, an asset field 420, and a permission field 430. The version field 410 contains version information of a DRM system. The asset field 420 contains information regarding content to be played back according to the rights object. The permission field 430 contains information regarding usage and action that are permitted by a right issuer with respect to the content protected through DRM.

The information stored in the asset field 420 will be described in detail.

"id" information indicates an identifier used to identify the rights object.

"uid" information is used to identify the content the usage of which is dominated by the rights object and is a uniform resource identifier (URI) of content data of a DRM content format (DCF).

"inherit" information specifies the inheritance relationship between assets the usage of which is dominated by the rights object and contains information regarding a parent asset. If inheritance relationship is present between two assets, a child asset inherits all rights of a parent asset.

"KeyValue" information contains a binary key value used to encrypt the content, which is referred to as a content encryption key (CEK). The CEK is a key value used to decrypt encrypted content to be used by a device. When the device receives the CEK from a secure multimedia card, it can use the content.

Information stored in the permission field 430 will now be described in detail.

"idref" information has a reference value of the "id" information stored in the asset field 420.

"Permission" is a right to use content permitted by the right issuer. Types of permission include "Play", "Display", "Execute", "Print", and "Export".

"Play" is a right to display DRM content in an audio/video format. Accordingly, a DRM agent does not allow an access based on "Play" with respect to content such as JAVA games that cannot be expressed in the audio/video format.

Play permission may optionally have a constraint. If a specified constraint is present, the DRM agent grants a right to Play according to the specified constraint. If no specified constraints are present, the DRM agent grants unlimited Play rights.

"Display" indicates a right to display DRM content through a visual device. A DRM agent does not allow an access based on Display with respect to content such as gif or jpeg images that cannot be displayed through the visual device.

Display permission may optionally have a constraint. If a specified constraint is present, the DRM agent grants a right to Display according to the specified constraint. If no specified constraints are present, the DRM agent grants unlimited Display rights.

"Execute" indicates a right to execute DRM content such as JAVA games and other application programs. Accordingly, a DRM agent does not allow an access based on Execute with respect to content that cannot be expressed through such methods.

Execute permission may optionally have a constraint. If a specified constraint is present, the DRM agent grants a right to Execute according to the specified constraint. If no specified constraints are present, the DRM agent grants unlimited Execute rights.

"Print" indicates a right to generate a hard copy of DRM content such as jpeg images. Accordingly, a DRM agent does not allow an access based on Print with respect to content that cannot be expressed through such methods.

Print permission may optionally have a constraint. If a specified constraint is present, the DRM agent grants a right to Print according to the specified constraint. If no specified constraints are present, the DRM agent grants unlimited Print rights.

In the description of the exemplary embodiments of the present invention, the term "playback" implies "Play", "Display", "Execute", and "Print". Since parameter values included in an instruction may be different according to the characteristics of the content and other constraints may be needed according to the characteristics of the content, the playback is subdivided into such multiple items. In open mobile alliance (OMA) DRM widely spread as a DRM standard, playback is divided into "Play", "Display", "Execute", and "Print". Accordingly, when the present invention agrees with the OMA DRM as much as possible, DRM-related products using the present invention can be easily utilized.

"Export" indicates a right to send DRM content and a corresponding rights object to a DRM system other than an OMA DRM system or a content protection architecture.

Export permission has a constraint essentially. The constraint specifies a DRM system of a content protection architecture to which DRM content and its rights object can be sent. The Export permission is divided into a move mode and a copy mode. When a rights object is exported from a current DRM system to another DRM system, the rights object is deleted from the current DRM system in the move mode but is not deleted from the current DRM system in the copy mode.

Figure 5:
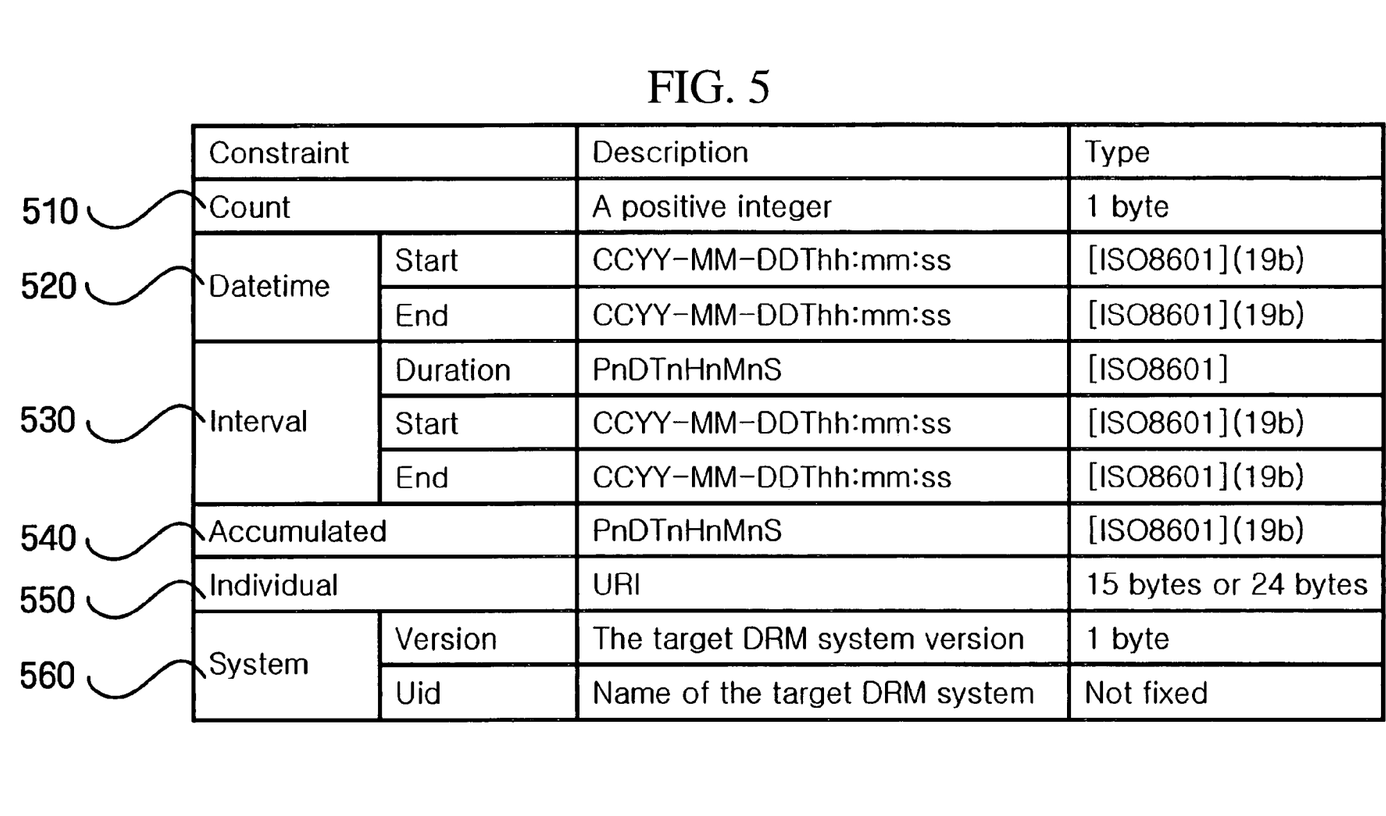
FIG. 5 illustrates types of constraints on a rights object according to an exemplary embodiment of the present invention.

FIG. 5 illustrates types of constraints on a rights object according to an exemplary embodiment of the present invention. Consumption of digital content is restricted by constraints to "Permission".

A Count constraint 510 has a positive integer value and specifies the count of permissions granted to content. A DRM agent does not permit an access to DRM content when the number of accesses exceeds the count specified by the Count constraint 510. In addition, if the value of the Count constraint 510 is not a positive integer, a DRM agent does not permit an access to the DRM content.

A Datetime constraint 520 specifies a duration for a permission and selectively contains a start item or an end item. When the start item is contained, consumption of the DRM content is not permitted before a specified time/date. When the end item is contained, consumption of the DRM content is not permitted after a specified time/date. Accordingly, if a value of the start item is greater than a value of the end item, a DRM agent does not permit an access to the DRM content.

In a format of the start and end items, "CC" indicates a century, "YY" indicates an year, "MM" indicates a month, "DD" indicates a date, "T" is a separator between date and time, and "hh:mm:ss" indicates "hour:minute:second".

An Interval constraint 530 specifies a time interval at which a rights object can be executed for the corresponding DRM content.

A start item or an end item may be selectively contained. When the start item is contained, consumption of the DRM content is permitted during a period of time specified by a duration item after a specified time/date. When the end item is contained, consumption of the DRM content is permitted during the period of time specified by the duration item before a specified time/date. Accordingly, if a current time is beyond an interval specified by the Interval constraint 530, a DRM agent does not permit an access to the DRM content. For example, when the duration item is expressed as P2Y10M15DT10H30M20S, the interval is 2 years, 10 months, 15 days, 10 hours, 30 minutes and 20 seconds.

An Accumulated constraint 540 specifies a maximum time interval for an accumulated measured period of time while the rights object is executed for the corresponding DRM content. If the accumulated measured period of time exceeds the maximum time interval specified by the Accumulated constraint 540, a DRM agent does not permit an access to the DRM content.

An Individual constraint 550 specifies a person to whom the DRM content is bound, for example, using a uniform resource identifier (URL) of the person. Accordingly, if a device user's identity is not identical with the identity of the person permitted to use the DRM content, a DRM agent does not permit an access to the DRM content.

A System constraint 560 specifies a DRM system or a content protection architecture to which the content and the rights object can be exported. A version item specifies version information of the DRM system or the content protection architecture. A "uid" item specifies a name of the DRM system or the content protection architecture.

Figure 6:
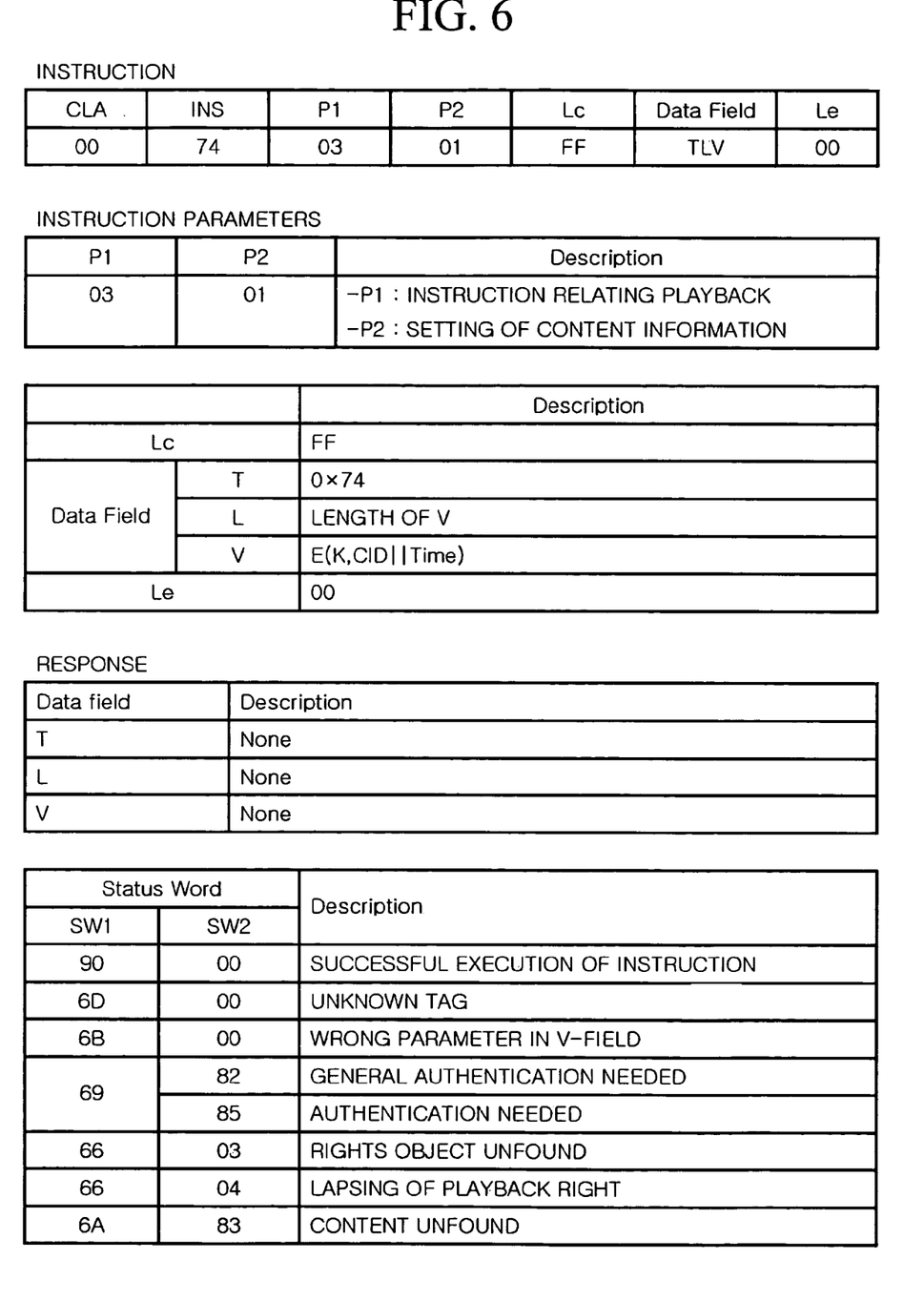
FIG. 6 illustrates an example of formats of an instruction, instruction parameters, and a response according to an exemplary embodiment of the present invention.
Figure 7:
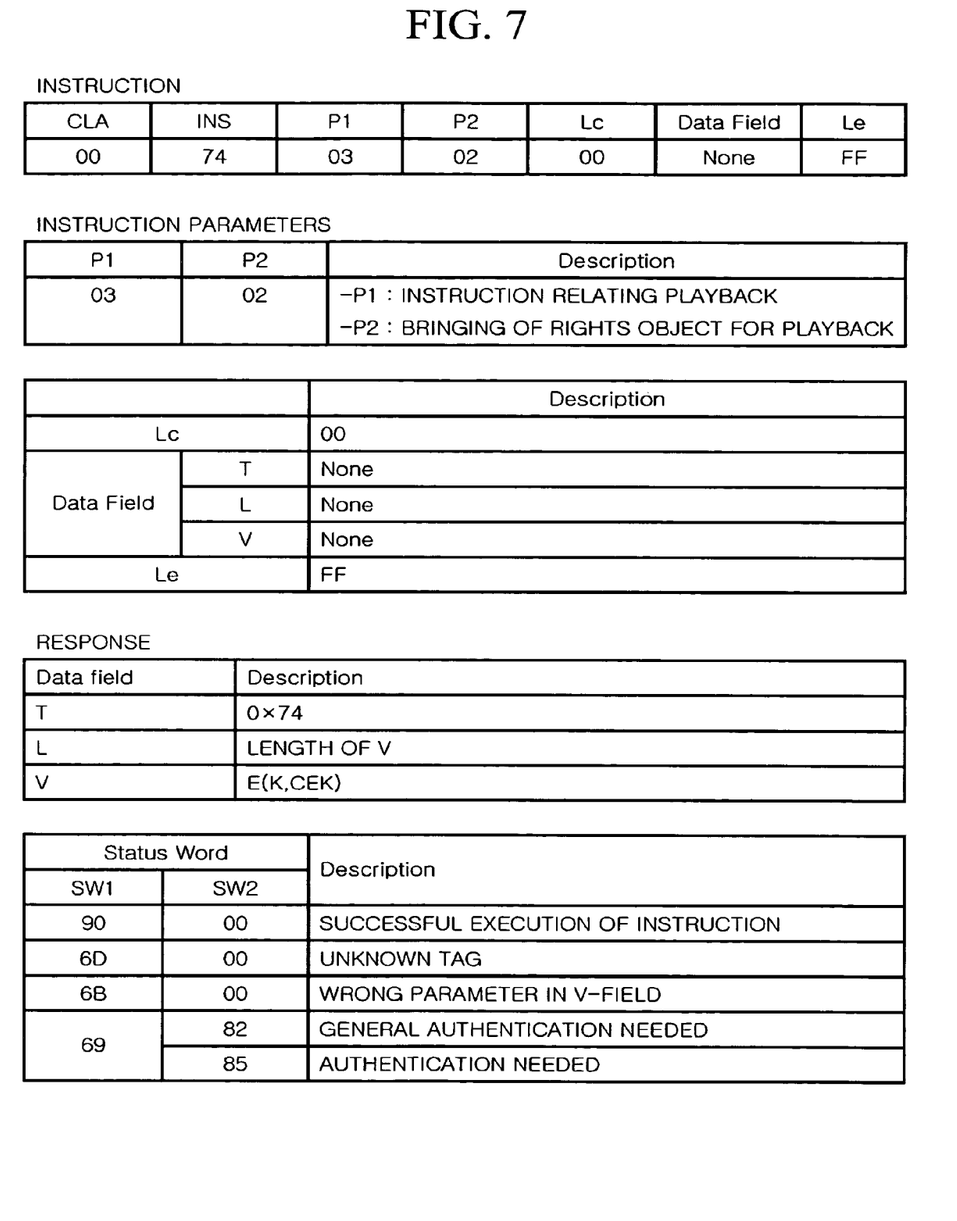
FIG. 7 illustrates another example of formats of an instruction, instruction parameters, and a response according to an exemplary embodiment of the present invention.

FIGS. 6 and 7 illustrate examples of formats of an instruction, instruction parameters, and a response according to an exemplary embodiment of the present invention in which a device generates the instruction and a secure multimedia card generates the response.

FIG. 6 illustrates an instruction and instruction parameters used when the device 310 sends the Playback right setting request in operation S200, as shown in FIG. 3, and a response to the instruction, which is generated by the secure multimedia card 320.

The instruction includes a CLA field, an INS field, a P1 field, a P2 field, an Lc field, a Data field, and an Le field. The instruction is identified by the CLA field, the INS field, the P1 field, and the P2 field. In detail, the CLA field indicates a class of the instruction and the INS field indicates a type of the instruction. The P1 and P2 fields indicate instruction parameters. The Data field includes data to be sent with the instruction and has a TLV format where "T" indicates a tag, "L" indicates a length of "V", and "V" indicates the data.

The response made by the secure multimedia card 320 with respect to the instruction has the TLV format and includes a status word indicating the status of the response.

For example, in a Play right setting request instruction, the CLA field and the INS field have values of "00" and "74", respectively. The P1 field has a value of "03", which indicates that the instruction relates to playback. The P2 field has a value of "01", which instructs to set content information. The Lc field and the Le field have values of "FF" and "00", respectively, which indicates that data is present. In the Data field, "T" is set to 0x74, "L" indicates the length of "V", and "V" includes a content's ID (CID). In an embodiment of the present invention, the CID and time are encrypted using a session key and then transmitted.

The response of the secure multimedia card 320 has none for the T, L, and V but expresses the status of the response using a status word. When the instruction has been executed successfully, SW1 and SW2 included in the status words have values of "90" and "00", respectively. When the instruction has an unknown tag, SW1 and SW2 have values of "6D" and "00", respectively. When a wrong parameter is present in a V-field, SW1 and SW2 have values of "6B" and "00", respectively. When general authentication is needed, SW1 and SW2 have values of "69" and "82", respectively. When authentication is needed, SW1 and SW2 have values of "69" and "85", respectively. When a rights object for the content is not found, SW1 and SW2 have values of "66" and "03", respectively. When a Playback right lapses, SW1 and SW2 have values of "66" and "04", respectively. When the content is not found, SW1 and SW2 have values of "6A" and "83", respectively. Referring to FIG. 3, when the device 310 sends the Playback right setting request in operation S200 and the device 310 and the secure multimedia card 320 do not share the session key, the secure multimedia card 320 cannot decrypt the CID and time that are encrypted using the session key and included in the V-field. In this case, authentication is needed. Accordingly, the secure multimedia card 320 makes a status word having values "69" and "85" as SW1 and SW2, respectively, and sends the status word to the device 310 as the response.

FIG. 7 illustrates an instruction and instruction parameters used when the device 310 sends the Playback right transmission request in operation S220, as shown in FIG. 3, and a response to the instruction, which is generated by the secure multimedia card 320.

The CLA field and the INS field have values of "00" and "74", respectively. The P1 field has a value of "03", which indicates that the instruction relates to playback. The P2 field has a value of "03", which instructs to bring a rights object needed to playback the content. The Lc field and the Le field have values of "00" and "FF", respectively, which indicates that no data is present.

In the response of the secure multimedia card 320, "T" is set to 0x74, "L" indicates the length of "V", and "V" includes a result of encrypting a CEK using a session key (K). When the CEK has been successfully encrypted, the status word has values "90" and "00" as SW1 and SW2, respectively.

In the exemplary embodiments of the present invention illustrated in FIGS. 6 and 7, a device sends an instruction to a secure multimedia card and the secure multimedia card sends a response to the instruction back to the device. However, other embodiments are possible. For example, a device may send a Playback right transmission request including a CID to a secure multimedia card and the secure multimedia card may send an encrypted CEK to the device. In this embodiment of the present invention, the device does not separately send the Playback right setting request and the Playback right transmission request in operations S200 and S220 as shown in FIG. 3. Meanwhile, in an exemplary embodiment of the present invention, the secure multimedia card may update a rights object immediately after transmitting a Playback right. Alternatively, the secure multimedia card may update the rights object in response to a rights object update request sent from the device after succeeding the playback of the content.

Figure 8:
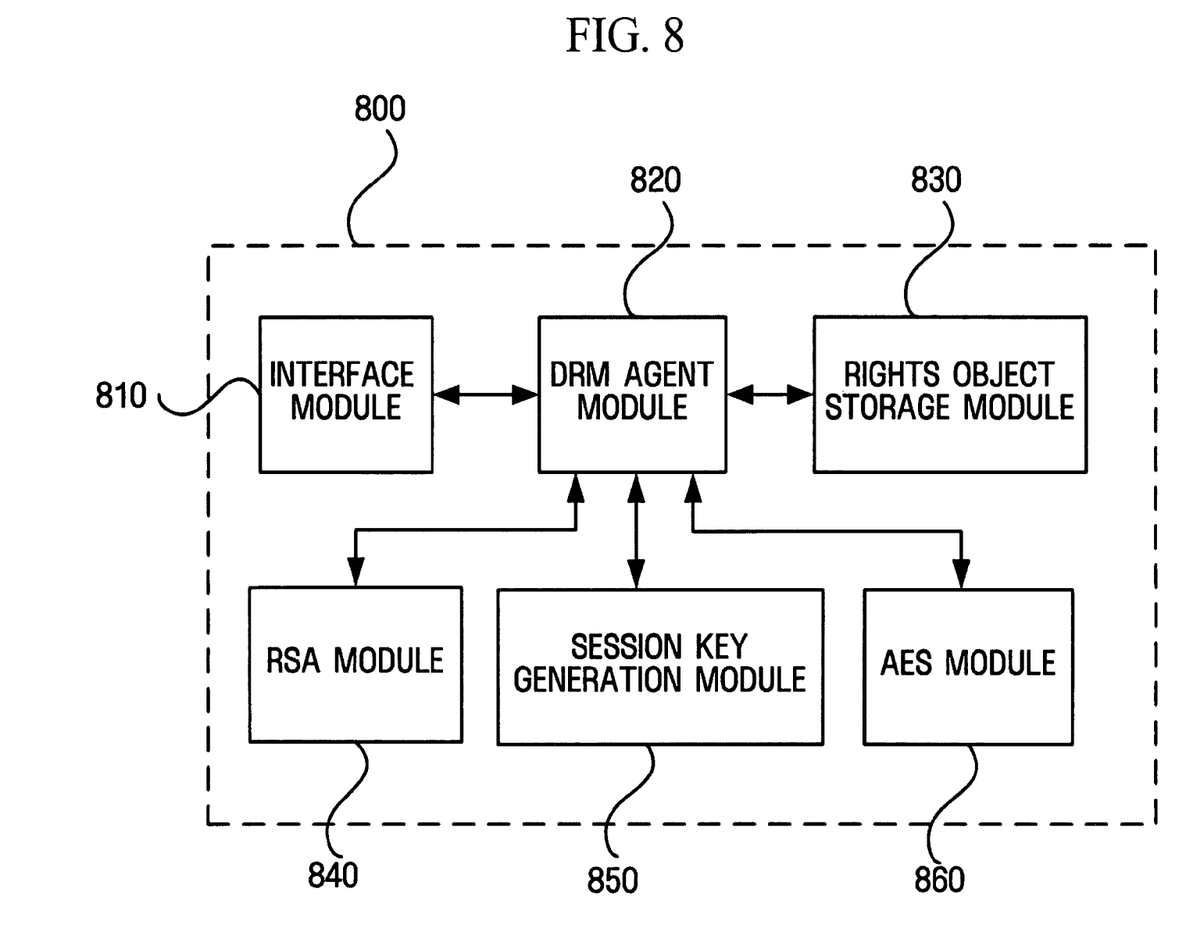
FIG. 8 is a block diagram of a secure multimedia card according to an exemplary embodiment of the present invention.

FIG. 8 is a block diagram of a secure multimedia card 800 according to an exemplary embodiment of the present invention.

In the illustrative embodiment, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or secure MMC.

To implement a DRM procedure, the secure multimedia card 800 needs a security function, a function of storing content or a rights object, a function of exchanging data with a device, and a DRM function. To perform these functions, the secure multimedia card 800 includes an RSA module 840, a session key generation module 850, and an advanced encryption standard (AES) module 860 that have an encryption function, a rights object storage module 830 with a storage function, an interface module 810 allowing data exchange with the device, and a DRM agent module 820 controlling each module to perform DRM operations.

The interface module 810 allows the secure multimedia card (MMC) 800 to be connected with the device. When the secure MMC 800 is connected with a device, fundamentally, the interface module 810 of the secure MMC 800 is electrically connected with an interface module of the device. However, the electrical connection is just an example, and the connection may indicate a state in which the secure MMC 800 can communicate with the device through a wireless medium without contact.

The RSA module 840 performs public-key encryption. More particularly, the RSA module 840 performs RSA encryption according to a request from the DRM agent module 820. In embodiments of the present invention, during authentication, the RSA encryption is used for key (random number) exchange or digital signature. However, the RSA encryption is just an example, and other public-key encryption may be used.

The session key generation module 850 generates a random number to be transmitted to the device and generates a session key using the generated random number and a random number received from the device. The random number generated by the session key generation module 850 is encrypted by the RSA module 840 and then transmitted to the device through the interface module 810.

The AES module 860 performs symmetric-key encryption using the generated session key. More particularly, the AES module 860 uses AES encryption to encrypt a content encryption key from an RO with the session key and to encrypt other important information during communication with another device. In an embodiment of the present invention, the session key is used to encrypt an RO during move of the RO. The AES encryption is just an example, and other symmetric-key encryption such as DES encryption may be used.

The rights object storage module 830 stores rights objects. The ROs are stored in an encrypted state. The secure MMC 800 encrypts an RO according to the AES encryption using a unique key that cannot be read by another device or a secure MMC and decrypts the RO using the unique key to move or copy the RO to another device or a secure MMC. The encrypting of an RO using the unique key according to the symmetric-key encryption is just an example. Alternatively, an RO may be encrypted using a private key of the secure MMC 800 and may be decrypted using a public key of the secure MMC 800 when necessary.

The DRM agent module 820 controls the above-described elements of the secure multimedia card 800 to perform DRM operations.

Figure 9:
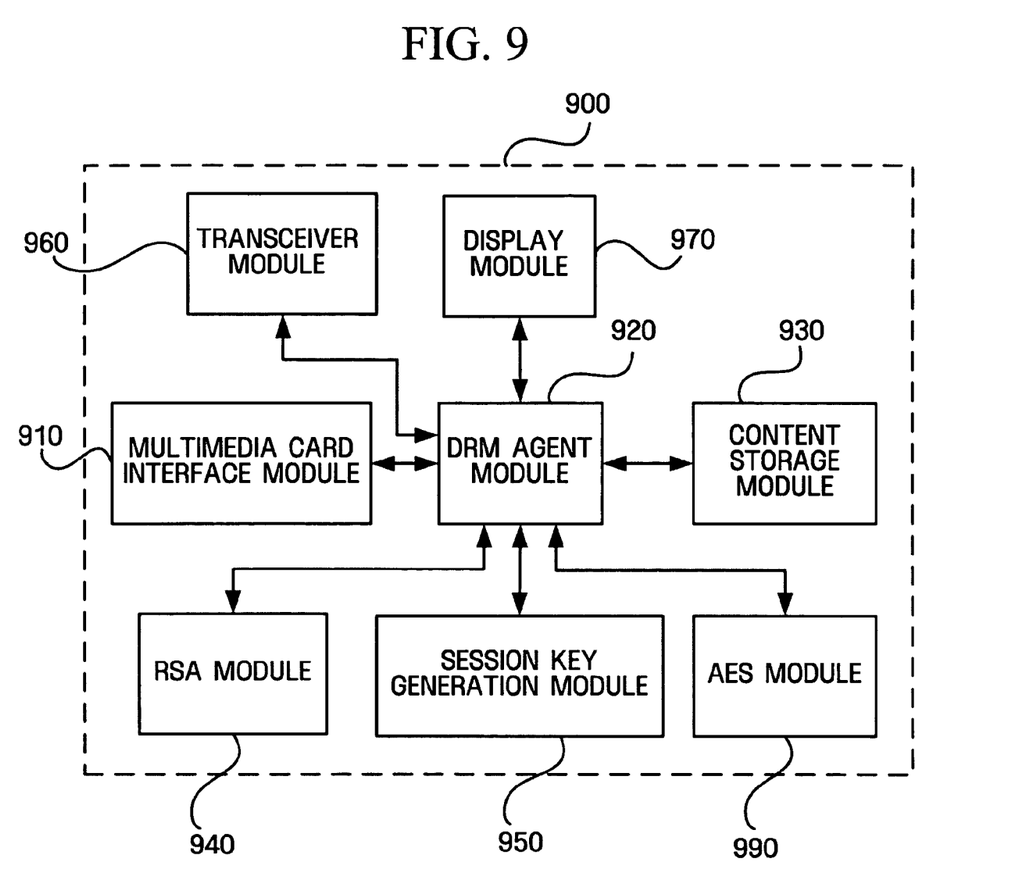
FIG. 9 is a block diagram of a device according to an exemplary embodiment of the present invention.

FIG. 9 is a block diagram of a device 900 according to an exemplary embodiment of the present invention.

To implement a DRM procedure, the device 900 needs a security function, a function of storing content or a rights object, a function of exchanging data with another device, a data transmit/receive function allowing communication with a contents issuer or a rights issuer, and a DRM function. To perform these functions, the device 900 includes an RSA module 940, a session key generation module 950, and an AES module 990 that have an encryption function, a content storage module 930 with a storage function, a multimedia card interface module 910 allowing data exchange with a secure multimedia card, and a DRM agent module 920 controlling each module to perform the DRM procedure. In addition, the device 900 includes a transceiver module 960 for the data transmit/receive function and a display module 970 displaying playback content.

The transceiver module 960 allows the device 900 to communicate with a contents issuer or a rights issuer.

The multimedia card interface module 910 allows the device 900 to be connected with a secure multimedia card. When the device 900 is connected with a secure MMC, fundamentally, the MMC interface module 910 of the device 900 is electrically connected with an interface module of the secure MMC. However, the electrical connection is just an example, and the connection may indicate a state in which the device 900 can communicate with the secure MMC through a wireless medium without contact.

The RSA module 940 performs public-key encryption. More particularly, the RSA module 940 performs RSA encryption according to a request from the DRM agent module 920. In embodiments of the present invention, during authentication, the RSA encryption is used for key (random number) exchange or digital signature. However, the RSA encryption is just an example, and other public-key encryption may be used.

The session key generation module 950 generates a random number to be transmitted to the secure multimedia card and generates a session key using the generated random number and a random number received from the secure multimedia card. The random number generated by the session key generation module 950 is encrypted by the RSA module 940 and then transmitted to the secure multimedia card through the interface module 910. Instead of generating the random number in the session key generation module 950, the random number may be selected from a plurality of random numbers provided in advance, as described above.

The AES module 990 performs symmetric-key encryption using the generated session key. The content storage module 930 stores contents protected through DRM. Content protected through DRM is encrypted using a CEK. To play back the content protected through DRM, the CEK is needed. After finishing the playback of the content, the content is encrypted using the CEK again and stored.

The display module 970 visually displays the playback of content whose rights object permits playback. The display module 970 may be implemented by a liquid crystal display (LCD) device such as a thin-film transistor (TFI) LCD device or an organic electroluminescent (EL) display device.

The DRM agent module 920 controls the above-described elements of the device 900 to perform DRM operations.

While the present invention has been particularly shown and described with reference to exemplary embodiments thereof, it will be understood by those of ordinary skill in the art that various changes in form and details may be made therein without, departing from the spirit and scope of the present invention as defined by the following claims. For example, in the exemplary embodiment illustrated in FIG. 3, the secure multimedia card 320 may encrypt the CEK using the device public $key_D$ instead of using the session key when transmitting the CEK to the device 310. Therefore, the disclosed exemplary embodiments of the invention are used in a generic and descriptive sense only and not for purposes of limitation.

According to the present invention, a device can play back content protected through DRM using a portable storage.

What is claimed is:

1. A method of playing back content using a portable storage, the method comprising:
   performing authentication between a device and the portable storage by each of the device and the portable storage verifying a certificate of another of the device and the portable storage;
   generating by the device, a session key by combining a random number generated by the portable storage and another random number generated by the device;
   requesting by the device, the portable storage to set a playback right for content protected through digital rights management (DRM);
   receiving by the device, an encrypted playback right for the content protected through DRM from the portable storage; and
   decrypting by the device, the encrypted playback right with the session key to generate a decrypted playback right and playing back the content protected through DRM using the decrypted playback right,
   wherein the playback right is encrypted by the portable storage.

2. The method of claim 1, wherein the content protected through DRM is encrypted content, and the encrypted playback right is a content encryption key used to decrypt the encrypted content.

3. The method of claim 2, wherein the content protected through DRM is decrypted using the content encryption key to be played back and is encrypted using the content encryption key after being played back.

4. The method of claim 1, wherein the receiving of the encrypted playback right comprises: requesting the portable storage to transmit the playback right; and
   receiving the encrypted playback right sent from the portable storage as a response to the requesting.

5. The method of claim 1, further comprising requesting the portable storage to update a rights object including the playback right.

6. The method of claim 1, wherein the encrypted playback right is received as a solitary file.

7. The method of claim 1, wherein the receiving the encrypted playback right for the content protected through DRM from the portable storage comprises receiving only the encrypted playback right.

8. A method of delivering a playback right for content from a portable storage to a device, the method comprising:
   performing authentication between the device and the portable storage by each of the device and the portable storage verifying a certificate of another of the device and the portable storage;
   generating by the portable storage, a session key by combining a random number generated by the portable storage and another random number generated by the device;
   receiving by the portable storage, a request to set the playback right for content protected through digital rights management (DRM) from the device;
   finding by the portable storage, a rights object including the playback right and encrypting by the portable storage, the playback right obtained from the rights object with the session key; and
   transmitting by the portable storage, the encrypted playback right to the device.

9. The method of claim 8, wherein the content protected through DRM is encrypted content, and the playback right is a content encryption key used to decrypt the encrypted content.

10. The method of claim 9, further comprising encrypting the updated rights object.

11. The method of claim 8, wherein the transmitting of the encrypted playback right comprises: receiving a request to transmit the playback right from the device; and transmitting the encrypted playback right to the device as a response to the request.

12. The method of claim 8, further comprising updating the rights object including the playback right.

13. A computer readable medium having a program recorded thereon, the program for playing back content using a portable storage comprising:
   an interface module which connects with a device;
   a rights object storage module which stores at least one encrypted rights object;
   an encryption module which generates a session key by combining a random number generated by the portable storage and another random number generated by the device and which performs symmetric-key encryption and public-key encryption; and
   a digital rights management (DRM) agent module which performs DRM operations, wherein the DRM agent module finds a rights object for content among rights objects stored in the rights object storage module when receiving a request for the playback right for the content from the device through the interface module, decrypts the rights object using the encryption module to find a content encryption key included in the rights object, encrypts the content encryption key using the encryption module using the session key, and sends the content encryption key which has been encrypted to the device through the interface module.

14. The computer readable medium of claim 13, wherein the DRM agent module updates the rights object, encrypts the rights object which has been updated using the encryption module, and stores the rights object which has been encrypted in the rights object storage module.

15. An apparatus for playing back content using a portable storage, the apparatus comprising:
   an interface which connects with the portable storage;
   a content storage module which stores on a computer readable medium at least one content protected through digital rights management (DRM);
   an encryption module on a computer readable medium which generates a session key by combining a random number generated by the portable storage and another random number generated by the apparatus and performs symmetric-key encryption and public-key encryption; and
   a DRM agent module on a computer readable medium which performs DRM operations, wherein the DRM agent module requests a playback right for content that is protected through DRM and stored in the content storage module from the portable storage via the interface, receives a content encryption key encrypted using the session key from the portable storage, decrypts the content encryption key which has been received using the encryption module, and decrypts the content protected through DRM using the content encryption key which has been decrypted to play back the content, wherein the content encryption key is encrypted by the portable storage.

16. The apparatus of claim 15, wherein the DRM agent module on the computer readable medium encrypts the content protected through DRM using the encryption module and stores the content in the content storage module after playing back the content.

17. A recording medium having a computer readable program recorded therein, the program for executing a method of playing back content using a portable storage, the method comprising:

performing authentication between a device and the portable storage by verifying each other's certificate;

generating a session key by combining a random number generated by the portable storage and another random number generated by the device;

requesting the portable storage to set a playback right for content protected through DRM;

receiving an encrypted playback right for the content protected through DRM from the portable storage; and decrypting the encrypted playback right with the session key to generate a decrypted playback right and playing back the content protected through DRM using the decrypted playback right, wherein the playback right is encrypted by the portable storage.

18. A recording medium having a computer readable program recorded therein, the program for executing a method of delivering a playback right for content from a portable storage to a device, the method comprising:

performing authentication between the device and the portable storage by verifying each other's certificate;

generating a session key by combining a random number generated by the portable storage and another random number generated by the device;

receiving a request to set the playback right for content protected through DRM from the device;

finding a rights object including the playback right and encrypting the playback right obtained from the rights object with the session key; and transmitting the encrypted playback right to the device.

* * * * *